US008145559B2

(12) United States Patent
Roberts et al.

(10) Patent No.: US 8,145,559 B2
(45) Date of Patent: *Mar. 27, 2012

(54) METHODS AND INVESTMENT INSTRUMENTS FOR PERFORMING TAX-DEFERRED REAL ESTATE EXCHANGES

(75) Inventors: Neal Roberts, Santa Monica, CA (US); Michael Franklin, Carlsbad, CA (US); Charles Runnels, Scottsdale, AZ (US); James Andrews, Los Angeles, CA (US)

(73) Assignee: American Master Lease, L.L.C., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/083,134

(22) Filed: Apr. 8, 2011

(65) Prior Publication Data

US 2011/0184850 A1 Jul. 28, 2011

Related U.S. Application Data

(63) Continuation of application No. 12/539,752, filed on Aug. 12, 2009, now Pat. No. 7,925,572, which is a continuation of application No. 09/956,372, filed on Sep. 17, 2001, now abandoned, which is a continuation of application No. 09/205,633, filed on Dec. 3, 1998, now Pat. No. 6,292,788.

(51) Int. Cl.
*G06Q 40/00* (2006.01)
(52) U.S. Cl. .............................................. 705/37; 705/4
(58) Field of Classification Search ..................... 705/35, 705/37, 38
See application file for complete search history.

(56) References Cited

U.S. PATENT DOCUMENTS

| 5,262,942 | A | 11/1993 | Earle |
| 5,500,793 | A | 3/1996 | Deming, Jr. et al. |
| 5,802,501 | A | 9/1998 | Graff |
| 5,873,071 | A | 2/1999 | Ferstenberg et al. |
| 5,892,900 | A | 4/1999 | Ginter et al. |
| 5,926,793 | A | 7/1999 | de Rafael et al. |
| 5,950,175 | A | 9/1999 | Austin |
| 6,192,347 | B1 * | 2/2001 | Graff .......................... 705/36 R |
| 6,292,788 | B1 | 9/2001 | Roberts et al. |
| 6,393,415 | B1 | 5/2002 | Getchius et al. |

OTHER PUBLICATIONS

Louis S. Weller. "Current Opportunities Using Like-Kind Exchanges", Tax Management Real Estate Journal. Washington: Jul. 2, 1997. vol. 13, Iss. 7; p. 153-167, 15.*
"REITs 101: What is a REIT?," http://www.reitnet.com/reits101/definition.html, Oct. 28, 1998.

(Continued)

*Primary Examiner* — Ojo O Oyebisi
(74) *Attorney, Agent, or Firm* — Blakely Sokoloff Taylor & Zafman LLP

(57) ABSTRACT

Methods and investment instruments for investing in real estate are described wherein a portfolio of investment real estate is divided into a plurality of tenant-in-common deeds of predetermined denominations, and which are subject to a master agreement and master lease to form "deedshares." Holders of the deedshares receive a guaranteed income stream from the master lease and yearly depreciation, without having to maintain or manage the real estate. The holders of deedshares are subject, under the master agreement, to a mechanism that enables the master tenant to purchase, or arrange for the purchase of the deedshares at fair market value (or some other calculable value) at the end of a specified term. Because the deedshares qualify as interests in investment real estate, they are eligible for tax-deferred treatment under §1031 of the Internal Revenue Code.

16 Claims, 5 Drawing Sheets

OTHER PUBLICATIONS

"REITs 101: Benefits of Investing in REITs," http://www.reitneret.com/reits101/benefits.html, Oct. 28, 1998.

"REITs 101: REIT Classification," http://www.reitnet.com/reits101/classification.html, Oct. 28, 1998.

"REITs 101: The History of REITs," http://www.reitnet.com/reits101/history.html, Oct. 28, 1998.

"REITs 101: Types of REITs," http://www.reitnet.com/reits101/types.html, pp. 1-2, Oct. 28, 1998.

"REITS 101: Investing in REITs," http:www.reitnet.com/reits101/investing.html, pp. 1-2, Oct. 28, 1998.

"The Property Report-REIT Interest: First Industrial Will Buy, Sell or Lease-For a Fee," WSJ Interactive Edition, Wall Street Journal, http://interactive.wsj.com/inap-bin/bb_idd?story_ptr=4&search_string=FR&m . . . /17+12%3A0, pp. 1-3, Nov. 4, 1998.

<www.mack-cali.com/about/>.

<www.mack-cali.com/shareholders/aboutreits.phtml>.

<www.mack-cali.com/sharesholders/glossary.phtlm>.

26 U.S.C.A. § 856 (West 1988 & Supp. 1998) (Definition of real estate investment trust).

26 U.S.C.A. § 1031 (West 1988 & Supp. 1998) (Exchange of property held for productive use or investment).

Real Estate Acquisition Opportunities, Prime Group Realty Trust [online], Retrieved from the Internet: <URL:http://www.pgrt.com/cs_acq.html>.

"Property Swap Raises Questions of Tax Deferment", [Final Edition], The Sun, Baltimore, Md., (Nov. 15, 1992), p. 6.J.

Ayella, A. J., "Charting a Profitable Course in 1031 Exchanges", The National Public Accountant, Washington, vol. 39, Iss. 6, (Jun. 1994), p. 32, 5 pgs.

Bottiglieri, T., "Special-purpose entities and tax-free exchanges", The Tax Adviser, New York, vol. 29, Iss. 2, (Feb. 1998), p. 84, 2 pgs.

Cali Realty Corporation, "Cali Realty Corporation Announces . . . ", Cranford, NJ, Mar. 20, 1996, Retrieved from the Internet: <URL: http://www.mack-cali.com/news/article.phtmll?id=37653870ebb44>.

Egerton, C. H., et al., "Like-Kind Exchanges of Real Properties", Tax Management Real Estate Journal, Washington, vol. 11, Iss. 9, (Sep. 6, 1995), p. 189.

Fellows, P., "Tenancy Estate Rights are Spelled Out in the Deed of Conveyance", SA2 Edition, Toronto Star, Toronto, Ontario, (Oct. 1, 1988), p. C.2.

Fine, H., "Banking on Change: When 1980's Turmoil Turned Real Estate Investors on One Another, CEO Allen Boerner of Cambio Investments Found Tenants in Common", Orange County Business Journal, Newport Beach, vol. 13, Iss. 8, Sec. 1, (Jul. 16, 1990).

Fisher, J., "REITs 101: Are REITs in Your Portfolio Yet?," http://www.reitnet.com/reits101/portfolio.html, (Oct. 28, 1998).

MacDonald, S. L., "For Best Results in Like/Kind Exchanges, use a Facilitator and a Two-tier Structure", National Real Estate Investor, vol. 35 No. 6, (Jun. 1993), pp. 94-98.

Overholt, D. G., "Consider a Section 1031 Exchange", Journal of Accountancy, New York, vol. 182, Iss. 1, (Jul. 1996), p. 45, 3 pgs.

Seltzer, B. M., et al., "The Consequences of Electing Out of Subchapter K", Tax Executive, Washington, vol. 44, Iss. 4, (Jul./Aug. 1992), p. 264, 9 pgs.

Wasserman, W. P., "The Like-Kind Basis Shuffle: Mr. Mogul's Section 1031 Dance of Perpetual Tax Deferral (Part Two)", Tax Management Real Estate Journal, Washington, vol. 12, Iss. 3, (Mar. 6, 1996), p. 55, 4 pgs.

Weller, L. S., "Current Opportunities Using Like-Kind Exchanges", *Tax Management Real Estate Journal*, Washington, vol. 13, Iss. 7, (Jul. 2, 1997), p. 153, 15 pgs.

\* cited by examiner

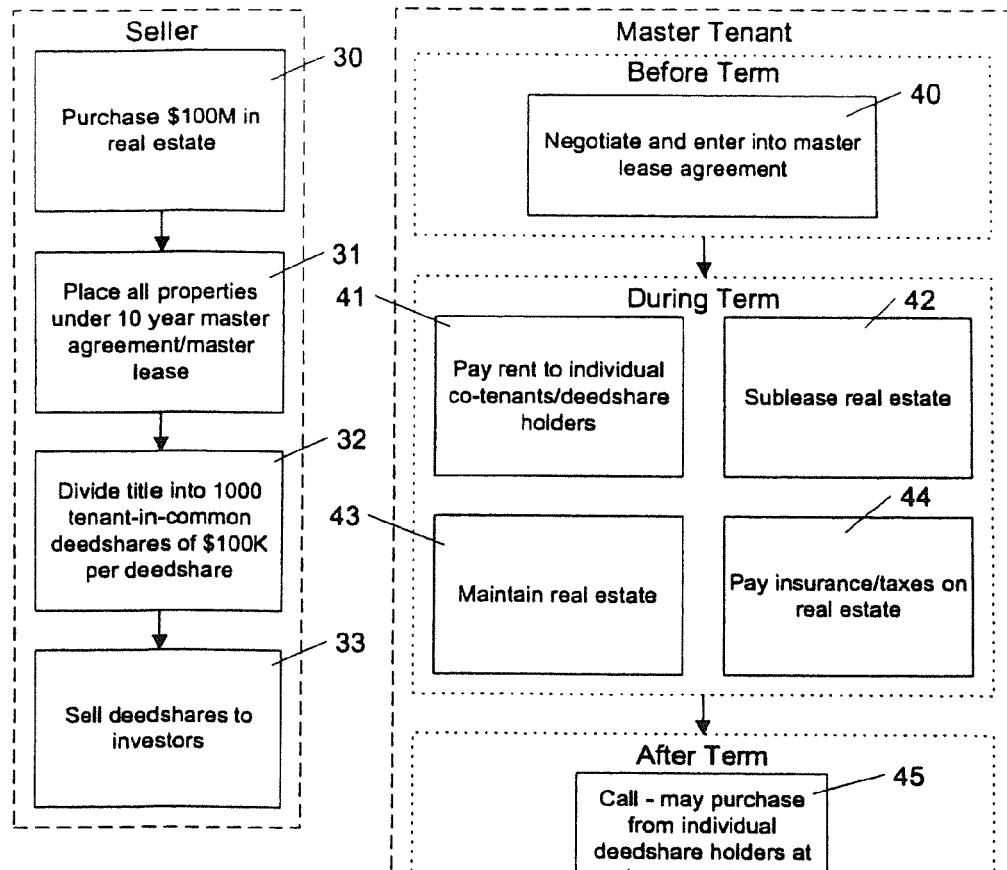
FIG. 4A
FIG. 4B
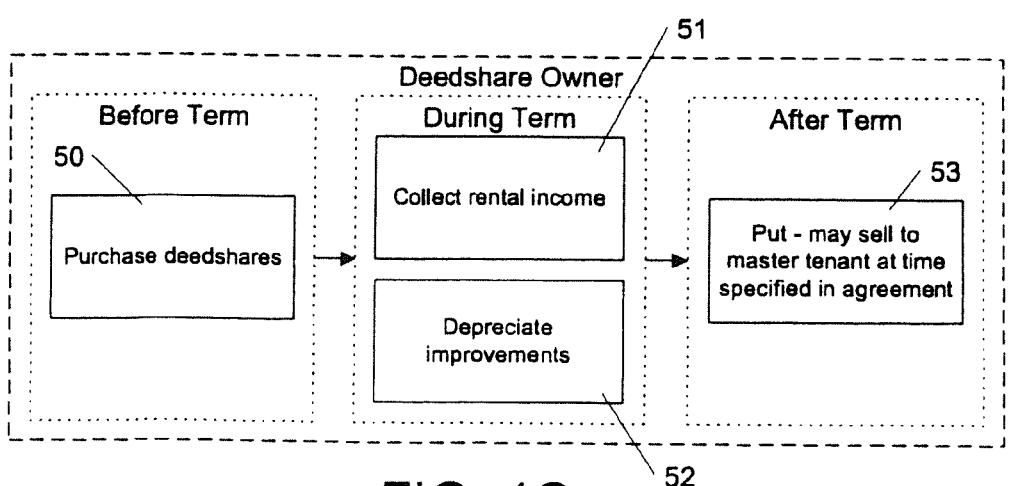
FIG. 4C

METHODS AND INVESTMENT INSTRUMENTS FOR PERFORMING TAX-DEFERRED REAL ESTATE EXCHANGES

CROSS-REFERENCE TO RELATED APPLICATIONS

This is a continuation of application Ser. No. 12/539,752 filed Aug. 12, 2009, now U.S. Pat. No. 7,925,572, which application is a continuation of application Ser. No. 09/956,372 filed Sep. 17, 2001, abandoned, which application is a continuation of application Ser. No. 09/205,633 filed Dec. 3, 1998, now U.S. Pat. No. 6,292,788.

FIELD OF THE INVENTION

The present invention relates generally to methods and investment instruments for performing tax-deferred real estate transactions, and more particularly to methods and instruments for performing tax-deferred exchanges of investment real estate under 26 U.S.C. §1031.

BACKGROUND OF THE INVENTION

As the population of America ages, the investment concerns of Americans are changing. Mature investors desire investments that provide a safe, steady income stream. Such investors also generally desire liquidity, so that their investment interests can easily be sold or rearranged. Additionally, investors generally do not want to actively manage their investments.

Mature investors also may have numerous concerns related to inheritance. For example, most mature investors would like their investments to be divisible, so that they may be easily divided among heirs. Additionally, these investors may want their estates to be able to sell part of their investment holdings to pay estate taxes.

Investment real estate has difficulties meeting many of these desires. Generally, small to mid-sized real estate holdings require active management to return a steady income. Furthermore, if an investor divides the title to a small real estate holding, such as a store, or a single building, the pieces generally have less value than the whole and are difficult, expensive and time-consuming to sell. Many of the foregoing concerns affect investors of all age groups, particularly in view of the challenging lifestyles of most modern American workers and professionals.

Despite the foregoing difficulties, however, a large amount of money is currently invested in real estate that is either income-producing or held for investment. In 1996, for example, the total value of commercial real estate in the United States was estimated at approximately four trillion dollars. Much of this real estate (approximately $2.75 trillion in 1996) was privately owned and held by individuals and corporations. A sizable fraction of these holdings are owned by small to mid-sized real estate investors (i.e., those having holdings between $500,000 and $10 million).

Such small to mid-sized real estate owners can sell their real estate and put their earnings into investments such as high grade bonds or bond funds, which provide the kind of liquidity, and relatively safe and steady income that many investors desire. Unfortunately, selling investment real estate or commercial real estate that has appreciated in value may result in severe tax consequences. For example, a property that was originally purchased many years ago for $50,000, and sold for $450,000, has a taxable gain of $400,000. Under the current tax code, as much as 28% of this gain (or $112,000), is payable as federal tax.

Title 26, Section 1031 of the Internal Revenue Code (hereinafter "IRC §1031") permits deferral of the taxes on investment real estate by reinvesting in other investment real estate, subject to several conditions. Thus, for example, the owner of a small store could use a "1031 exchange" to defer taxes when he or she sells the store and reinvests the proceeds in an apartment building. To receive all of the benefits from an IRC §1031 exchange, the new property (the "replacement property") must have both value and debt that are equal to or greater than the value and debt of property being sold (the "relinquished property").

Thus, if the relinquished property was sold for $450,000, and was subject to a $100,000 mortgage, the replacement property must be purchased for at least $450,000, and must be subject to at least $100,000 in debt. If the value or debt of the replacement property is less than that of the relinquished property, taxes are payable on the difference, known as "boot".

IRC §1031 also imposes certain time limits for completion of the transaction. Once the relinquished property has changed ownership, the owner of the exchanged property (the "exchanger") has 45 days to identify replacement property choosing either the three-property or the 200% rule, and a total of 180 days to close on the replacement properties. If these time limits are not met, the transaction is not deemed to be an "exchange," and gains from the sale are subject to taxation. Additionally, the exchanger cannot exercise control, either direct or indirect, over the proceeds of the sale of the first property. For this reason, IRC §1031 exchanges generally are handled by a third party, a so-called "qualified intermediary," who sells the relinquished property on behalf of the exchanger, holds the proceeds of the sale, acquires the replacement property that has been designated by the exchanger, and transfers title to the replacement property to the exchanger.

IRC §1031 exchanges help in meeting the concerns of many investors by permitting a tax-deferred exchange. For most owners of high-maintenance investment or commercial real estate, or investment real estate without a safe, steady income stream, however, it is difficult to locate an acceptable replacement property requiring less active management and that produces a more steady income stream. Also, because the investment is still in real estate, other concerns of investors, such as liquidity and divisibility are not addressed by the availability of IRC §1031 exchanges. Furthermore, many attempted IRC §1031 exchanges fail, with devastating tax consequences, due to difficulties in identifying and closing on suitable replacement properties within the time limits imposed by the statute.

Numerous attempts have been made to provide real estate investments that are transferable, have a steady income stream, require low management effort, and are divisible. One way of gaining these benefits is by investing in a real estate investment trust (a "REIT"). A REIT is a company that buys, sells, manages, and develops real estate or real estate mortgages on behalf of its investors. Shares in a REIT may be purchased, or (for some REITs) acquired indirectly in exchange for property, as described below. These shares are often publicly traded on major exchanges, and have characteristics similar to the characteristics of shares in any other company. For example, the shares are easy to liquidate, and often provide a reasonably steady stream of income through dividends.

A real estate investor goes through a two-step process if he or she seeks to use a REIT to take advantage of a tax-exempt transaction. First, the investor contributes the real estate property to a partnership owned by the REIT. Next, at such time as the investor elects to liquidate his or her interest, he or she exchanges the partnership interest for REIT shares. The second exchange is a taxable exchange and the investor may not utilize IRC §1031 to acquire other real estate in a tax exempt transaction. Once the investor completes the first step the only option the investor has is to acquire REIT shares in a taxable transaction.

Basically, shares in a REIT are simply shares in a company—not a deeded ownership interest in specific commercial or investment real estate. Thus, individual shareholders in a REIT may not be able to exert much control over the size or investment quality of the holdings of the REIT over a long term. Also, the market value of the REIT shares may fluctuate differently than the market value of the assets owned by the REIT. In addition, an IRC §1031 exchange cannot be used to defer the taxes on an exchange of investment property for shares in a REIT. REITs therefore do not provide a way to convert an interest in real estate into an investment with more desirable characteristics without incurring significant market risk and tax consequences.

Another way of spreading the risk and management burden of a real estate investment is to join a group of investors to purchase real estate as tenants-in-common. In arrangements of this sort, each of the tenants-in-common typically receives an undivided part interest in the real estate that is the subject of the transaction, in proportion to the amount of his or her investment. The tenants-in-common also enter into an agreement providing for exercise of joint control over the property, and for sharing the maintenance and management costs.

While the foregoing approach may provide a steady income stream from a real estate investment with certain favorable attributes, such arrangements have several disadvantages. First, it may not be easy to liquidate an undivided part interest in real estate due to the specific nature of the underlying assets. Additionally, depending on the number of investors involved and the nature of the agreement under which control is exercised over the property, such an arrangement may be deemed by the Internal Revenue Service to constitute a partnership. Since IRC §1031 specifically excludes exchanges of interests in partnerships, it is not possible to do a tax deferred exchange into this type of arrangement.

In view of the foregoing, it would be desirable to provide methods of investing in real estate that provide safety, a steady income stream, divisibility, ready liquidity, and no involvement in management of the property.

It would further be desirable to provide an investment instrument and methods for exchanging investment or commercial real estate that provide safety, a steady income stream, divisibility, ready liquidity, and no involvement in management of the property, and that meet the requirements of IRC §1031, thereby enabling a tax-deferred exchange.

It still further would be desirable to provide an investment that permits substantial tax-deferral benefits, that may be readily alienated, and that provides a steady and relatively low risk return.

It even further would be desirable to provide a system for implementing methods that enable investors to realize substantial tax-deferred benefits in accordance with IRC §1031.

SUMMARY OF THE INVENTION

It is an object of the present invention to provide methods and an investment instrument for investing in real estate that provide safety, a steady income stream, divisibility, ready liquidity, and no involvement in management of the property.

It is another object of this invention to provide investment instruments and methods for exchanging investment or commercial real estate for an interest in investment in specific real estate that provide safety, a steady income stream, divisibility, ready liquidity, and no involvement in management of the property, and that meet the requirements of IRC §1031.

It is a further object of the present invention to provide an investment that permits substantial tax-deferral benefits, that may be readily alienated, and that provides a steady and relatively low risk return.

It is a still further object of the present invention to provide a system for implementing methods that enable investors to realize substantial tax-deferred benefits in accordance with IRC §1031.

These and other objects of the present invention are achieved by creating a new type of investment instrument, a "deedshare," that represents both a tenant-in-common interest in real estate, and provides the divisibility and liquidity of a traditional security, such as a bond. Deedshares created in accordance with the principles of the present invention preferably are available in predetermined denominations, provide a guaranteed steady income stream, are readily transferable, readily alienated, and are suitable for identification as replacement property under IRC §1031. The deedshares may be encumbered by a mortgage, as required by the particular needs of an individual investor, so as to comply with the debt provisions of IRC §1031. Because deedshares are a direct interest in investment real estate, and the tenant-in-common owners of the real estate do not exercise significant control, and thus are not deemed partners, investors may use IRC §1031 to perform tax-deferred exchanges.

In accordance with the methods of the present invention, a series of steps are involved in creating and managing this new type of real estate investment. First, real property having a preselected total value is purchased and aggregated, and may consist of a number of commercial real estate parcels. The aggregated properties are then made subject to at least one master agreement. Title to the property is then divided into tenant-in-common deeds of at least one pre-determined denomination. The master agreements include a provision by which the tenant-in-common deeds may be "reaggregated" after a specified interval, so that the property may be disposed of. The tenant-in-common deeds, subject to master agreements configured in accordance with the methods of the present invention, are referred to herein as "deedshares."

In a preferred embodiment, the master agreements include a master lease, under which the property is leased to a master tenant, who manages the property. During the term of the master lease, the deedshare holders receive a steady, guaranteed income stream from the master tenant, similar to the income one might expect from a high grade bond, e.g., a bond having an AA rating or better. This guaranteed steady income stream also provides a high degree of liquidity. The deedshare holders also obtain favorable tax treatment by being allocated their proportionate share of depreciation so long as they own a deedshare.

At the end of the interval specified in the master lease, the deedshares are subject to a put/call arrangement, whereby the individual owners of deedshares have a right and an obligation to sell their deedshares to the master tenant or some third-party, receiving fair market value for their deedshares. This serves to reaggregate title to the property under the master tenant. The former deedshare holders may, subject to IRC §1031 guidelines and prior to the reaggregation of the property, exchange the deedshares for deedshares having a later maturity date, or for other investment real estate, through another tax-deferred IRC §1031 exchange.

A system of implementing the deedshares and methods of the present invention is also provided for use with a computer system, which enable automated tracking of various items of information relating to the real estate portfolio, master agreement, and investors.

BRIEF DESCRIPTION OF THE DRAWINGS

The above and other objects and advantages of the present invention will be apparent upon consideration of the following detailed description, taken in conjunction with the accompanying drawings, in which:

FIGS. 4A-C illustrate steps taken by each party to an IRC §1031 exchange performed in accordance with a preferred embodiment of the present invention;

DETAILED DESCRIPTION OF THE INVENTION

Figure 1:
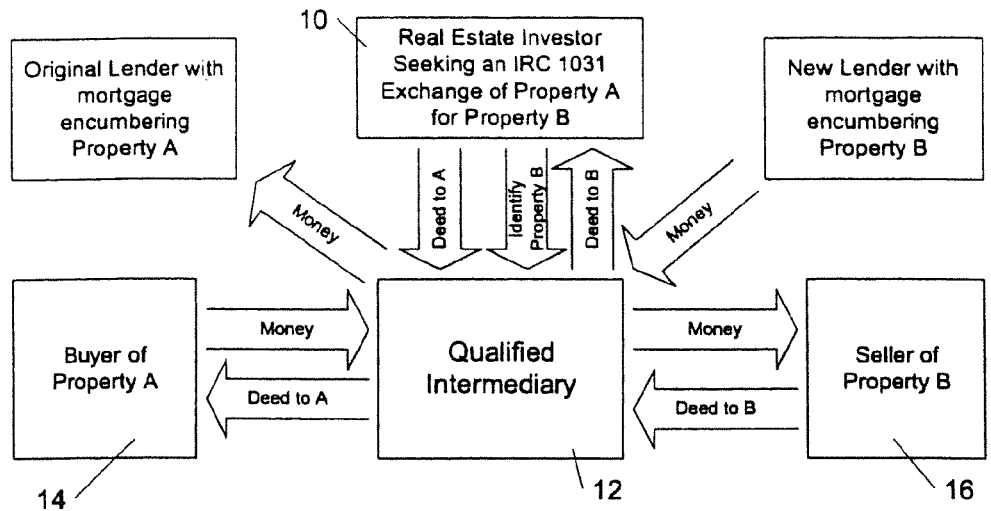
FIG. 1 illustrates a prior art IRC §1031 exchange conducted through a qualified intermediary.

Referring to FIG. 1, a previously known tax-deferred exchange according to IRC §1031 (Title 26, United States Code Section 1031) is described. Exchanger 10, who wishes to exchange investment real property A, provides a third party, typically qualified intermediary 12, with the deed to property A. Qualified intermediary 12 then transfers the property to buyer 14 in exchange for money. Once the property is transferred to buyer 14, IRC §1031 specifies that exchanger 10 has 45 days to designate replacement properties, and 180 days to close on any replacement properties for the transaction to be considered an "exchange." Exchanger 10 designates replacement investment real property B, owned by owner 16. Qualified intermediary 12 then acquires replacement property B from owner 16 and transfers replacement property B to exchanger 10 and money to owner 16. Exchanger 10 must obtain a mortgage replacement on property B in an amount at least equal to the amount of any mortgages on relinquished property A.

In designating replacement properties under IRC §1031, exchanger 10 may identify up to 3 potential properties to serve as replacements. More than three replacement properties may be identified, as long as the aggregate value of all of the designated properties adds up to no more than twice the value of the relinquished property.

IRC §1031 also requires that when the exchange is complete, the value and debt of the replacement property must both be greater than or equal to the value and debt of the relinquished property. If the replacement property has a lower value, or is subject to a smaller mortgage than the relinquished property, the boot is taxable. This rule ensures that taxes are paid on any money that is taken out of the investment real estate during the exchange.

Qualified intermediary 12 is used to perform the exchange, because if exchanger 10 exercises control over the money acquired from buyer 14, the entire transaction may not be viewed as an exchange of property, and the proceeds of the sale of the relinquished property may be taxable. It should also be noted that tax-deferred exchanges under IRC §1031 also require that the exchanger intend to hold the replacement property for productive use in a trade or business or for investment.

IRC §1031 also sets out certain exceptions. One important exception is that interests in a partnership are not subject to tax-deferred exchanges. Other exceptions include beneficial interests, and property held primarily for sale.

Problems with identifying and closing on replacement properties within the required time limits cause many attempted §1031 exchanges to fail, with substantial negative tax consequences to the property owner who was attempting the exchange. In addition, because §1031 exchanges simply trade the relinquished property for the replacement property, it is difficult to use a §1031 exchange to acquire an investment interest with diversity, divisibility, high liquidity, or guaranteed returns.

To address these difficulties with IRC §1031 exchanges, the applicants have developed new methods, and investment instruments especially suited for performing real estate exchanges. In accordance with the principles of the present invention, this new investment instrument provides an exchanger with a direct interest (i.e. not a beneficial interest or partnership interest) in real estate, so that a tax-deferred exchange under IRC §1031 may be used to trade into the new investment. The new investment also is easy to identify as a replacement property and to close on, so that there are no difficulties in completing the transaction within the time limits specified in IRC §1031. Additionally, the investment created in accordance with the present invention preferably provides guaranteed returns, a steady income stream, diversity, divisibility, and liquidity.

Figure 2:
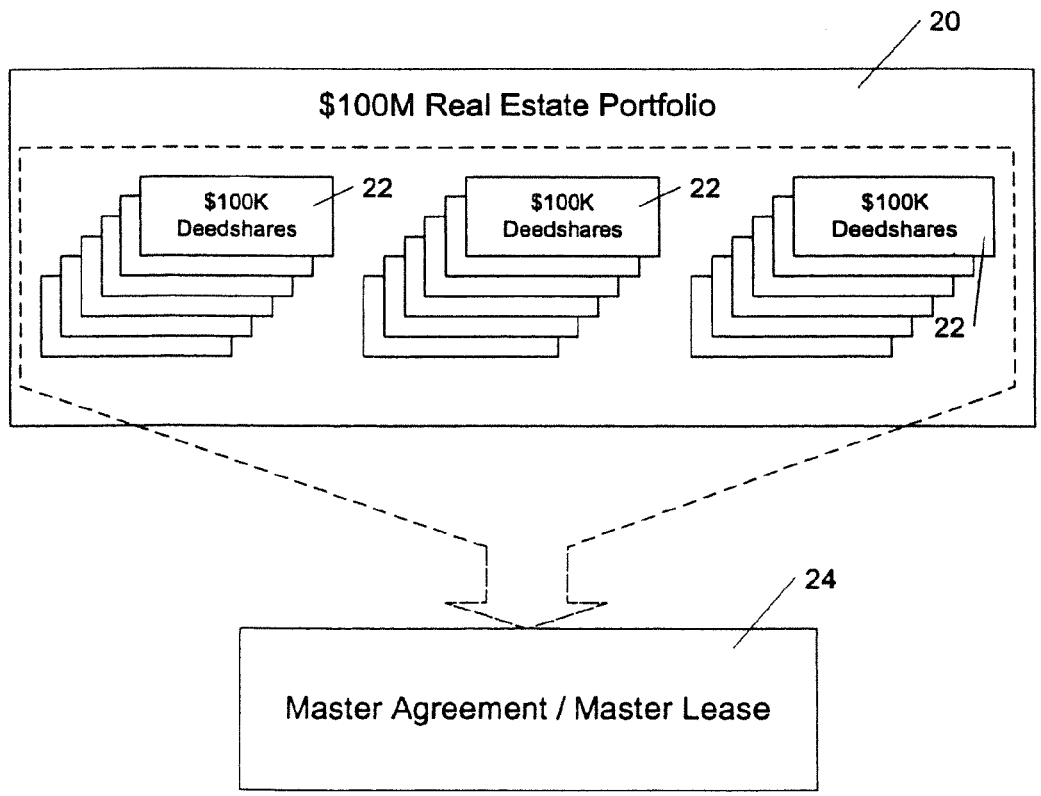
FIG. 2 shows the structure of the new real estate investment methods and investment instrument of the present invention.

Referring now to FIG. 2, the structure and operation of a preferred embodiment of the investment methods and investment instrument of the present invention are described. First, a number of commercial properties are identified and acquired to form a real estate portfolio 20, a process referred to herein as "aggregation." Because a large number of quality properties are selected for the portfolio, the aggregate value of the portfolio may be quite high, e.g., several tens of millions of dollars. This in turn makes the portfolio an attractive investment opportunity, and enables a resale market to be readily established.

Real estate portfolio 20, illustratively comprising real estate having a total value of $100 million, then is subjected to a master agreement, described hereinbelow, and divided into deedshares 22 having of a single or multiple specified denominations. In FIG. 2, each of deedshares 22 illustratively has a specified denomination of $100,000 per deed share, so that the $100 million value of real estate portfolio 20 is divided into one thousand $100,000 deedshares 22.

Each of deedshares 22 is a tenant-in-common deed to a proportional (0.1%) undivided part interest in real estate portfolio 20. As an interest in real property, each deedshare 22 may be subjected to a separate mortgage in whatever amount is required to meet the needs of a particular investor, thus enabling the transaction to comply with the debt provisions of IRC §1031. In accordance with the principles of the present invention, and to provide desirable characteristics such as liquidity and guaranteed income, each of deedshares 22 is created subject to master agreement 24, which preferably includes a master lease, as described hereinafter.

Master agreement 24 comprises an agreement that ensures that all of deedshares 22 can be reaggregated after a specified interval, e.g., 10 years, so that real estate portfolio 10 may be disposed of, and the proceeds distributed to the holders of deedshares 22. This mechanism provides a way to get invested money back out of real estate portfolio 20 without requiring that the holders of deedshares 22 exercise control over their individual ownership interests, thereby avoiding the attributes of a partnership.

In a preferred embodiment, the agreement to reaggregate the property interests of deedshares 22 may be achieved by building a put/call mechanism in the deedshare, whereby each of the individual owners of deedshares 22 has a right and an obligation to sell deedshares 22 to a specified buyer (e.g., the entity holding the master lease) at fair market value. Other types of agreements also may be used for this purpose. For example, master agreement 24 may include an exclusive sales provision, giving a specified real estate broker the exclusive right to sell real estate portfolio 20 after the specified time. Generally, any agreement whereby ownership of deedshares 22 is conditioned upon an agreement to sell the deedshares, at a specified time (or maturity date), or under specified conditions, is expected to accomplish the goal of reaggregating the tenant-in-common interests represented by deedshares 22 into a unified title in real estate portfolio 20.

Master agreement 24 preferably comprises provisions that prevent holders of deedshares 22 from providing common services with respect to real estate portfolio 20, from entering into joint venture activities with respect to real estate portfolio 20 with fellow owners of deedshares 22, from establishing a common trade name in relation to their holdings of deedshares 22, and from commingling or establishing joint financial arrangements with respect to real estate portfolio 20 with other owners of deedshares 22. These provisions are intended to prevent owners of deedshares 22 from acquiring the attributes of a partnership, which might otherwise make deedshares 22 ineligible for tax-deferred treatment under IRC §1031.

For the foregoing reason, master agreement 24 preferably also includes no provisions that require joint management activity on the part of owners of deedshares 22. For example, the owners of deedshares 22 should not be required (or permitted) to vote on the sale of real estate portfolio 20.

In a preferred embodiment, master agreement 24 comprises a master lease, whereby a master tenant is placed over the properties in real estate portfolio 20. The master tenant agrees to pay rent to the owner of portfolio 20, including the individual holders of deedshares 22, over a specified term. The master tenant also is given the right to sublease the real estate, and is responsible for paying the taxes, upkeep, maintenance, and insurance on the leased property.

The credit rating of the master tenant plays a role in ensuring that the holders of deedshares 22 receive a guaranteed income stream from the rent paid by the master tenant. Preferably, the master tenant is a commercial entity having at least an AA credit rating or better. Alternatively, a master tenant having a credit rating less than AA may be employed, in which case the master tenant may be "credit enhanced" by making a payment to a third party to guarantee any shortfall between the rate of return guaranteed in the deedshare and the actual income from the property.

Applicants believe that by providing a guaranteed income stream over a specified term, the investment instrument and methods of the present invention will make the investment value of deedshares 22 comparable to that of high quality commercial bonds. Accordingly, it should be possible to establish a market in this type of investment instrument, thus making deedshares 22 easy to liquidate. It is expected, for example, that it should be possible to buy or sell deedshares 22 in the same manner that bonds or shares of mutual funds currently are traded.

Master agreement 24 also may contain other provisions relating to the master tenant. For example, the put/call provisions preferably specify the master tenant as the entity to which deedshares 22 are sold at the end of the specified time. Additionally, it is possible to adjust the profit made by the master tenant on this sale by adjusting the term of the master lease and the specified time during which deedshares 22 are held to maturity.

For example, if the master lease is for a term of 15 years, but deedshares 22 call for title to the real estate portfolio to be reaggregated after 10 years, then the fair market value of real estate portfolio 20 will be influenced by the encumbrance of the additional five year term of the lease. Accordingly, the master tenant will be able to purchase real estate portfolio 20 back from the holders of deedshares 22 at a favorable price, thus encouraging the funding of such arrangements.

As will be understood by one skilled in the banking and investment arts, the size of real estate portfolio 20 may be selected to suit the needs of the prospective pools of investors. Additionally, the denominations of deedshares 22 may be selected at any suitable value, and real estate portfolio may include several classes of deedshares, each class having a different predetermined denomination. The terms of master agreement 24 also may be varied, depending on the nature and growth objectives of real estate portfolio 20 and the needs of prospective investors.

Figure 3:
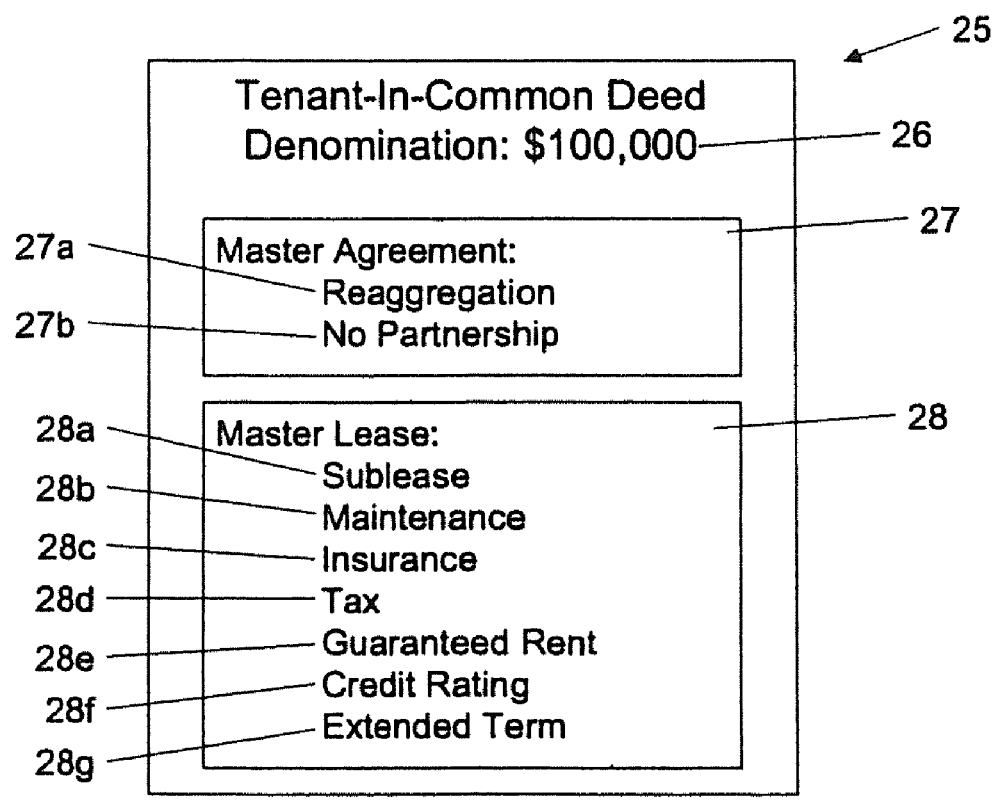
FIG. 3 depicts an illustrative embodiment of an investment instrument of the present invention.

Referring to FIG. 3, an example deedshare is shown. As discussed above, deedshare 25 comprises a tenant-in-common part interest in the property. Deedshare 25 has predetermined denomination 26 ($100,000 in this case), that determines the share of an overall real estate portfolio that is represented by deedshare 25. Deedshare 25 also includes master agreement 27, that includes provision 27a for reaggregating title to the property in the real estate portfolio after a specified interval. In a preferred embodiment, this is accomplished through use of a put/call provision, as explained above.

In a preferred embodiment of deedshare 25, master agreement 27 also comprises provision 27b, which prevents holders of the deedshares from exercising control over the property interest represented by deedshare 25, so that the deedshare holders may not be deemed to be a partnership, as explained above. A preferred embodiment of deedshare 25 is also encumbered by master lease 28, whereby the real estate interest represented by deedshare 25 is leased for a specified term to a master tenant in exchange for rent paid to the owners of the real estate, including the holder of deedshare 25.

Master lease 28 preferably includes sublease provision 28a, permitting the master tenant to sublease the real estate, maintenance provision 28b, requiring the master tenant to maintain the real estate, insurance provision 28c, requiring the master tenant to insure the real estate, and tax provision 28d, requiring the master tenant to pay taxes on the real estate. The master lease also may include guaranteed rent provision 28e, designating that the master tenant pay a predetermined guaranteed income to the holder of deedshare 25, and credit rating provision 28f, requiring that the master tenant have a minimum credit rating of AA. Additionally, master lease 25 may contain extended term provision 28g, designating that the master lease extends beyond the term of the master agreement, affecting the fair market value of the property, as discussed above.

Referring now to FIGS. 4A-C, the steps taken by various parties in accordance with a preferred embodiment of the methods of the present invention are described. In FIG. 4A, the steps taken by the seller of the deedshares, who may be the master tenant, are shown. First, at step 30, the seller purchases and aggregates a real estate portfolio having a predetermined value, e.g., $100 million.

In step 31, the real estate portfolio is encumbered with a master agreement and master lease for a specified interval, e.g., 10 years. The master agreement includes a mechanism, discussed hereinabove, to reaggregate title from the holders of the deedshares to enable the real estate portfolio to be disposed of at the end of the term of the master agreement. In step 32, title to the real estate in the portfolio is divided into tenant-in-common deeds having a predetermined denomination, e.g., 1000 deeds each having a $100,000 value, creating "deedshares." Finally, at step 33, the seller sells the deedshares to the public, either directly, or through qualified intermediaries via IRC §1031 exchanges.

FIG. 4B shows the steps taken by the master tenant, starting with entering into the master lease, at step 40. During the term of the master lease, several steps are taken. At step 41, the master tenant pays monthly rent on the lease to the deedshare holders (co-tenants). The master tenant then subleases the property (typically at a profit) to one or more subtenants at step 42. In steps 43 and 44, the master tenant maintains the property, and pays the taxes and insurance on the property. When the term of the deedshare has expired, at step 45, the master tenant exercises his call to purchase the deedshares from the individual deedshare holders at a calculable value, such as fair market value.

FIG. 4C shows the steps taken by a deedshare holder. At step 50, the deedshares are purchased from the seller, either directly, or through a qualified intermediary as part of an IRC §1031 exchange, as described in greater detail hereinbelow. During the term of the deedshares, the deedshare holder receives guaranteed monthly income from the rent paid by the master tenant (step 51). During the term of the deedshares, each deedshare holder is permitted to depreciate the deedshare holder's tax basis in any improvements on the property for tax-accounting purposes (step 52). At the end of the term, at step 53, the deedshare holder exercises his put to force the master tenant to purchase the deedshares at fair market value. Prior to the end of the term of the master lease, a deedshare owner may freely alienate title to the deedshare.

It should be noted that in this preferred embodiment, if neither the put nor the call are exercised, the master tenant continues to pay rent to the deedshare holder to the end of the term of the master lease, and the deedshare holder continues to collect monthly income from the property, and yearly depreciation. Also, as discussed hereinabove with reference to FIG. 2, numerous modifications may be made to this arrangement. These modifications may include changing the size of the real estate portfolio, the denominations of the deedshares, the term of the master lease, the term of the deedshares before the put/call may be exercised, the terms of the master agreement, and the mechanism by which title to the real estate portfolio may be reaggregated.

Figure 5:
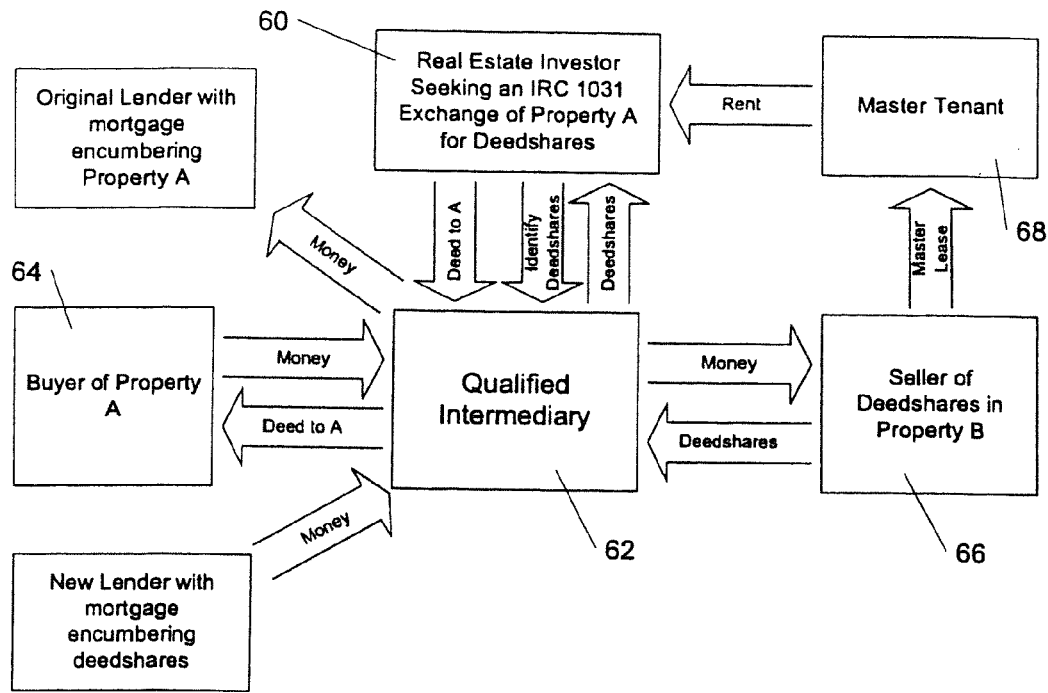
FIG. 5 shows an IRC §1031 exchange used for tax-deferred exchange of investment property for "deedshares" in accordance with the principles of the present invention.

Referring now to FIG. 5, the method of the present invention is described in the context of an IRC §1031 exchange. Since deedshares represent an interest in investment property, and the master agreement is designed to insure that the tenants-in-common do not acquire the attributes of a partnership, the deedshares are subject to tax-deferred treatment under IRC §1031.

Exchanger 60 of investment real property A provides qualified intermediary 62 with the deed to relinquished property A. Qualified intermediary 62 then transfers title to property A to buyer 64 in exchange for money. In accordance with the principles of the present invention, seller 66 of replacement property B encumbers property B with a master agreement, leases property B to a master tenant, and divides title in property B into tenant-in-common interests having predetermined denominations, to create deedshares.

Seller 66 then conveys an appropriate value of deedshares to qualified intermediary 62. Exchanger 60 identifies the deedshares of the present invention as the replacement property for the exchange and obtains a mortgage commitment in an amount at least equal to the mortgage on relinquished property A. Once the purchase of the deedshares "closes", qualified intermediary 62 transfers the deedshares to exchanger 60, thereby completing the exchange.

Applicants expect that there will be a ready market for deedshares, because there should be no difficulty identifying deedshares or closing on the identified deedshares within the time limits specified in IRC §1031. Moreover, applicants expect that by acquiring multiple deedshares (perhaps of different denominations) it will be easy to meet or exceed the value of the exchanged real estate using deedshares as the replacement property. Because the deedshares of the present invention represent an interest in real estate, they may be held subject to a mortgage, so the debt on the exchanged real estate also can be matched or exceeded, as required by IRC §1031.

During the remaining portion of the specified term of the deedshares, exchanger 60 collects an income stream from his deedshares from master tenant 68, and may depreciate his interest in improvements on the replacement property B. When the deedshares reach maturity, or when exchanger 60 decides to sell his deedshares, they may be sold for money, incurring tax liability at that time, or they may be exchanged for other deedshares or for other investment real estate through a further tax-deferred exchange under IRC §1031.

Figure 6:
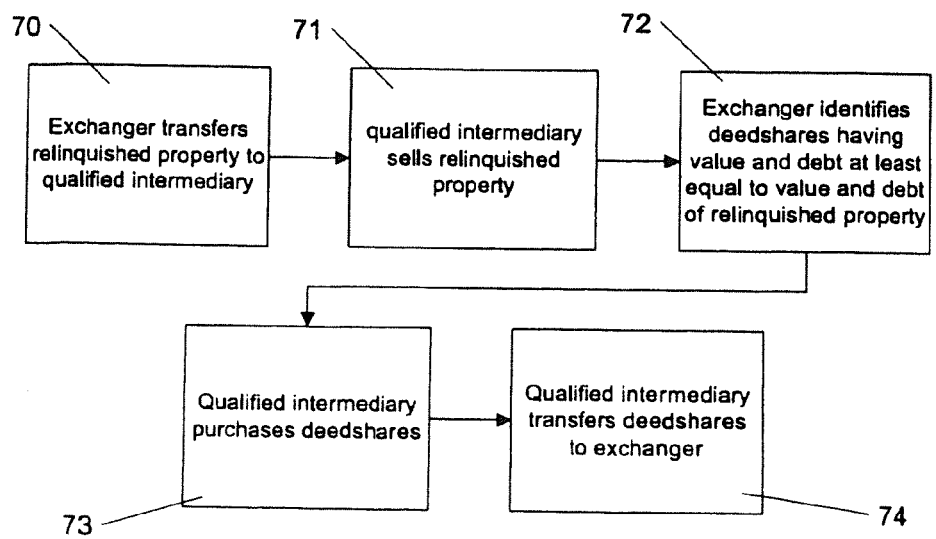
FIG. 6 is a flowchart of an IRC §1031 exchange in which investment property is exchanged for deedshares.

A flowchart showing the individual steps in the process for performing an IRC §1031 exchange of investment real estate for deedshares is shown in FIG. 6. At step 70, the exchanger (i.e., exchanger 60 of FIG. 5) transfers the deed to the relinquished property to a qualified intermediary. Next, at step 71, the qualified intermediary sells the relinquished property to a buyer, in exchange for money. Any mortgage on the relinquished property is paid from the proceeds of the sale. At this point, IRC §1031 specifies that the exchanger has 45 days to identify replacement property, and 180 days to close on the replacement property.

In step 72, the exchanger identifies deedshares, as described hereinabove, to the qualified intermediary as the replacement property. To avoid boot, the identified deedshares must have denominations that add up to a value at least equal to the value of the relinquished property, and must be subject to mortgages that will add up to a value at least equal to the value of the mortgage on the relinquished property In step 73, the qualified intermediary purchases the deedshares from a deedshare seller, closing the deal within the 180 day time limit specified in IRC §1031. Finally, in step 74, the qualified intermediary transfers the deedshares, subject to the appropriate mortgages, to the exchanger.

Figure 7:
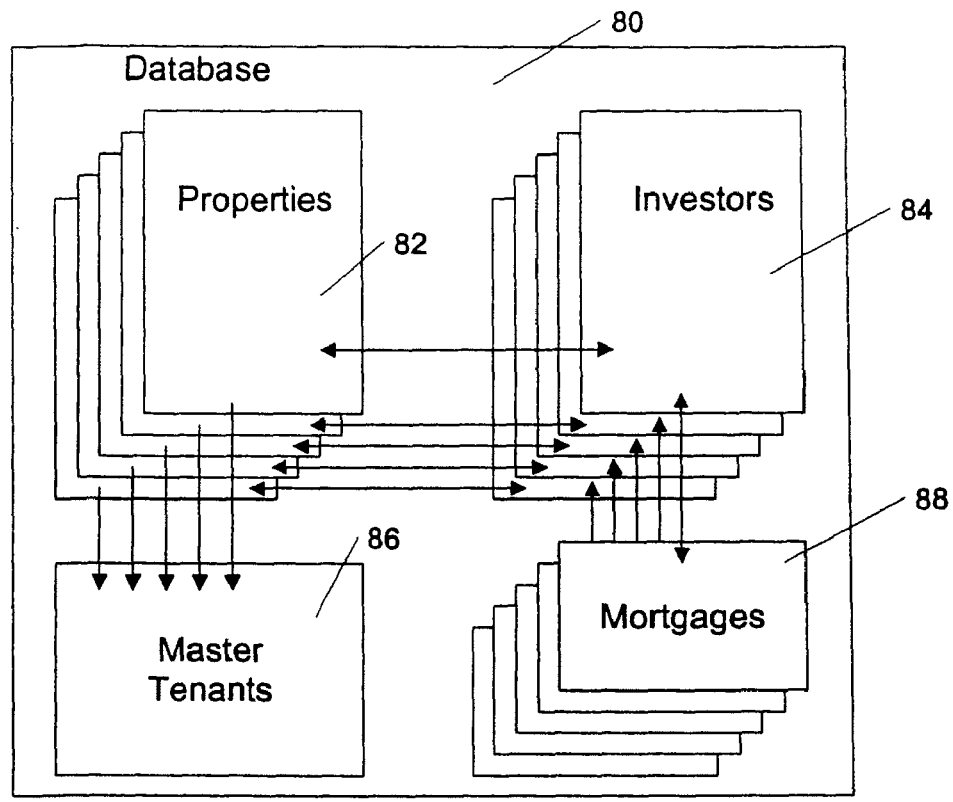
FIG. 7 depicts an illustrative computer database structure for implementing the methods and investment instrument of the present invention.

Referring now to FIG. 7, an illustrative implementation of the investment instrument and methods of the present invention is described. In FIG. 7, the properties and investors (deedshare holders) are tracked using a database application executed on a computer system. Database 80 contains four inter-related sets of tables—property tables 82, investor tables 84, master tenant table 86, and mortgage tables 88.

Each one of property tables 82 contains a list of properties associated with a single real estate portfolio that has been divided into deedshares, as described hereinabove. Each property in the list preferably includes information such as the name and address of the property, the type of property, the current income associated with the property, and the fair market value (as of last appraisal) of the property. Each property table, for example, may include information such as the total value of the properties in the table (real estate portfolio), the total number and denominations of outstanding deedshares on the properties in the table, and the date at which the deedshares become subject to the put/call under the master agreement. In addition, each one of property tables 82 may be associated with a master tenant in master tenant table 86.

Each one of property tables 82 is also associated with one of investor tables 84. Each investor table 84 preferably contains a list of all of the investors who hold deedshares in a particular real estate portfolio. For each investor, the database may include information such as the name and address of the investor, the number and denominations of deedshares held, the fair market value of the portion of the property associated with the deedshares (as of the last appraisal of the property), and the income provided to the investor based on the deedshares.

Master tenant table 86 may be a single table containing a list of the master tenants associated with each of the real estate portfolios. For each master tenant, database 80 preferably contains information such as the name and address of the master tenant, the credit rating of the master tenant (and any enhancement needed), and the rent paid by the master tenant under the master agreement. Alternatively, the identity of the master tenant, and related information, may be combined into property tables 82.

Mortgage tables 88 contain a list of the debt encumbering each investor's relinquished property and the debt associated with the deedshares held by each investor. This information may be used in conjunction with the information in property tables 82 to help investors assure that they obtain a sufficient mortgage on deedshares to comply with IRC §1031, and to assure lenders of the appropriate loan-to-value ratio which warrants the mortgage needed by investors.

Database 80 may be used to generate reports required by applicable securities laws, as well as reports on the value of each real estate portfolio, the rental income due to each deedshare holder, certain information required by deedshare holders to complete their income tax returns, or any other useful compilation of the data contained in database 80. Additionally, database 80 may be linked to other databases (either directly or through a network, such as the Internet), such as the databases kept by master tenants, to keep track of subleases and maintenance.

Pertinent information from database 80 may be made available to investors. The data in database 80 also may be made available to qualified intermediaries, to be used in identifying which deedshares of various real estate portfolios best match the needs of potential investors for IRC §1031 exchanges, or for identifying potential master tenants or subtenants.

It will be evident to one skilled in the art that there are other possible arrangements for the data in database 80. For example, the investor and property tables each may be organized as one large table, with each entry in the investor table having links to one or more of the entries in the properties table, and each entry in the properties table having links to one or more entries in the investor table. Also, the investor table may be replaced with a deedshare table, listing the deedshares in each of the real estate portfolios, wherein each deedshare entry contains information on an investor. Additionally, the information contained in each table may be varied. For example, each entry in the investors table may contain additional information on the investor, such as age, current income (for tax purposes), and information on other properties and investments held by the investor.

Figure 8:
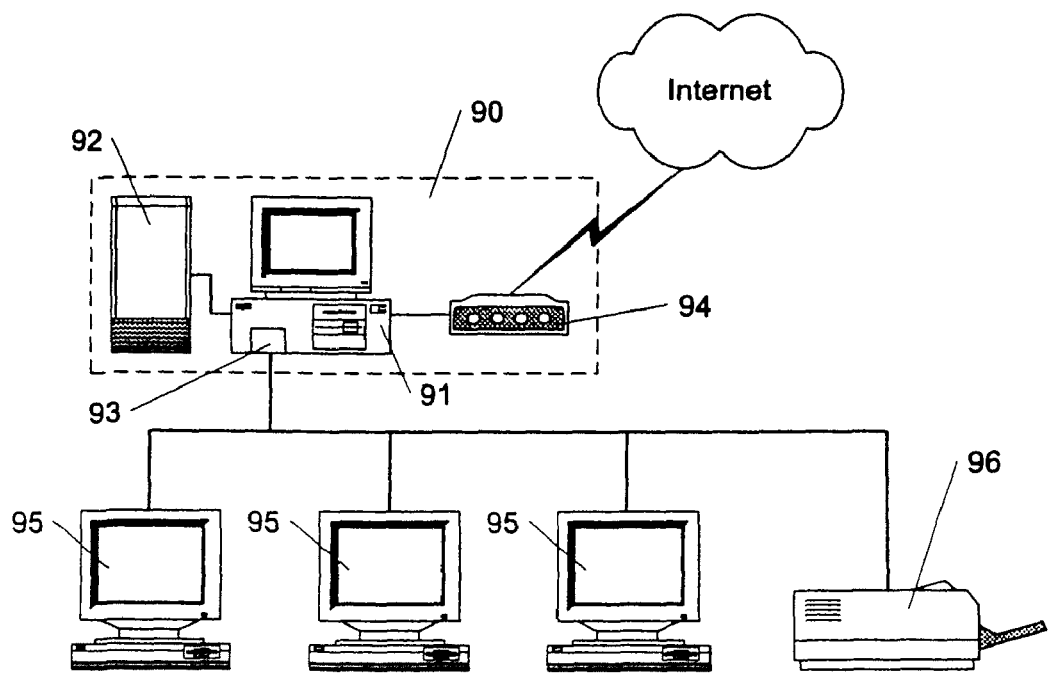
FIG. 8 shows an illustrative computer system and network for executing a database application implementing the methods and investment instrument of the present invention.

Referring to FIG. 8, an illustrative computer system and network for executing and accessing the database of FIG. 7 is shown. Computer system 90 is a database server that executes the database described hereinabove. Computer system 90 includes CPU 91, which executes instructions that implement a database server application, and mass storage 92, preferably a RAID array, on which the data that forms the database is stored. Computer system 90 also preferably includes network interface 93 so that the database may be accessed through other computers on a local area network.

Computer system 90 also preferably includes communication device 94, which may comprise a telephone modem, a cable modem, an ADSL modem, or any other device capable of communicating data between a computer and a wide area network. Communication device 94 is used to connect computer system 90 to a wide area network, preferably the Internet. This connection permits users at remote locations to access data in the database on computer system 90. These users may include deedshare brokers, qualified intermediaries, master tenants, deedshare owners, or others who are entitled to access the information in the database. To prevent unauthorized access to data, computer system 90 preferably executes security software as well as the database server application.

Computer system 90 is preferably connected to a local area network, having multiple client computers 95, each of which may be used to access the database on computer system 90. Additionally, printer 96, which may be used for printing database reports or for printing certificates representative of deedshares, is connected to the local area network. Alternatively, printer 96 may be connected directly to computer system 90.

Although preferred illustrative embodiments of the present invention are described above, it will be evident to one skilled in the art that various changes and modifications may be made without departing from the invention. It is intended in the appended claims to cover all such changes and modifications that fall within the true spirit and scope of the invention.

What is claimed is:

1. A computer database system for managing a plurality of investment instruments adapted for performing tax deferred exchanges of real properties comprising at least one database having:
    property related database entries containing information associated with at least one real property, wherein title for the at least one real property has been divided into a plurality of part interests, each one of the plurality of part interests subject to a master agreement and a reaggregation provision; and
    investor database entries containing information associated with holders of the plurality of part interests in the at least one real property.

2. The computer database system of claim 1 wherein the property related database entries comprise a name and an address of the at least one real property, a current income level associated with the at least one real property and a most recent fair market value of the at least one real property.

3. The computer database system of claim 1 wherein the investor related database entries comprise a name and address of each holder of the plurality of part interests in the at least one real property, a most recent fair market value of each holder's part interest and a current level of income provided to each holder.

4. The computer database system of claim 1 further comprising mortgage related database entries containing information associated with mortgage indebtedness of each holder of the plurality of part interests in the at least one real property.

5. The computer database system of claim 1 further comprising database entries containing information associated with the master agreement.

6. The computer database system of claim 5 wherein the master agreement is a master lease, and the database entries containing information associated with the master agreement include database entries containing information associated with a master tenant.

7. The computer database system of claim 6, wherein the database entries containing information associated with a master tenant comprise a name and address of the master tenant, a credit rating of the master tenant, and a value of rent paid by the master tenant.

8. The computer database system of claim 7 wherein the database includes property related database entries containing information associated with a plurality of real properties and further includes database entries containing information associated with a plurality of master tenants, each master tenant being associated with a corresponding real property.

9. The computer database system of claim 1 wherein the part interests comprise tenant-in-common deeds.

10. A computer implemented method of creating real estate investment instruments adapted for performing tax-deferred exchanges comprising:
   creating a real estate portfolio comprising at least one real property;
   storing information associated with each real property in the portfolio in a computer database;
   encumbering each real property in the real estate portfolio with a master agreement;
   dividing title in the real estate portfolio into a plurality of part interests, each of the part interests subject to a provision in the master agreement for reaggregating the plurality of part interests;
   selling the part interests to a plurality of investors;
   storing information associated with each of the plurality of investors in the computer database.

11. The computer implemented method of claim 10 wherein each of the part interests is a deedshare comprising a tenant-in-common deed to a portion of the real estate portfolio.

12. The computer implemented method of claim 11 wherein the deedshares have at least one predetermined denomination.

13. The computer implemented method of claim 11 wherein each deedshare is subject to a provision in the master agreement for reaggregating the plurality of tenant-in-common deeds after a specified interval.

14. The computer implemented method of claim 10 wherein encumbering each property in the real estate portfolio with a master agreement further comprises encumbering each property with a master lease to a master tenant who pays rent to holders of the part interests.

15. The computer implemented method of claim 14 wherein creating the plurality of part interests further comprises structuring the provision to include a put provision that allows holders of the part interests to force the master tenant to purchase their part interests at a calculable value and a call provision that allows the master tenant to force holders of the part interests to sell their part interests to the master tenant at a calculable value.

16. The computer implemented method of claim 14 wherein encumbering each property in the real estate portfolio with a master agreement further comprises including a sublease provision in the master lease enabling the master tenant to sublease the property.

\* \* \* \* \*